United States Patent
Lee et al.

(10) Patent No.: US 10,187,766 B2
(45) Date of Patent: Jan. 22, 2019

(54) METHOD AND APPARATUS FOR GATHERING LOCATION INFORMATION OF VEHICLE USER EQUIPMENT IN A WIRELESS ACCESS SYSTEM SUPPORTING V2X SERVICES

(71) Applicant: LG ELECTRONICS INC., Seoul (KR)

(72) Inventors: Ki-Dong Lee, San Diego, CA (US); Sang Gook Kim, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/565,128

(22) PCT Filed: Apr. 8, 2016

(86) PCT No.: PCT/KR2016/003681
§ 371 (c)(1),
(2) Date: Oct. 6, 2017

(87) PCT Pub. No.: WO2016/163791
PCT Pub. Date: Oct. 13, 2016

(65) Prior Publication Data
US 2018/0109937 A1    Apr. 19, 2018

Related U.S. Application Data

(60) Provisional application No. 62/145,457, filed on Apr. 9, 2015.

(51) Int. Cl.
*G08G 1/123* (2006.01)
*H04W 4/44* (2018.01)
(Continued)

(52) U.S. Cl.
CPC ............ *H04W 4/44* (2018.02); *G08G 1/0112* (2013.01); *G08G 1/096775* (2013.01); *H04L 67/12* (2013.01); *H04W 4/046* (2013.01)

(58) Field of Classification Search
CPC .......... G08G 1/20; G08G 1/0112; G08G 9/02; G01C 21/26; B60R 25/102; G01S 5/0027; G01S 17/936; H04W 72/005; H04W 4/046
(Continued)

(56) References Cited

U.S. PATENT DOCUMENTS 8,520,695 B1 * 8/2013 Rubin ................. G08G 9/02
370/445
8,903,424 B2 * 12/2014 Proietti ................ G01S 5/0027
340/539.13
(Continued)

OTHER PUBLICATIONS

PCT International Application No. PCT/KR2016/003681, Notification of Transmittal of the International Search Report and the Written Opinion of the International Searching Authority, or Declaration dated Jul. 25, 2016, 10 pages.

*Primary Examiner* — Hoi Lau
(74) *Attorney, Agent, or Firm* — Lee, Hong, Degerman, Kang & Waimey (57) ABSTRACT

The present invention provides methods and apparatus for gathering location information of a vehicular user equipment (VUE). In one aspect of the present invention, a method for gathering location information in a wireless access system supporting vehicle to everything (V2X) service, the method performed by a vehicular user equipment (VUE) and comprising steps of receiving a Tracking Service Request message including a V2X tracking service indication field indicating tracking service is triggered or not and an identifier of the VUE; and transmitting a Tracking Service Response message including location information of the VUE in
(Continued)

response to the Tracking Service Request message, wherein the location information includes a location information field indicating a location coordinate of the VUE, a time field indicating current time and time zone information corresponding to the location information field, and a fuel level field indicating fuel level of the VUE.

14 Claims, 4 Drawing Sheets

(51) Int. Cl.
*H04W 4/04* (2009.01)
*G08G 1/01* (2006.01)
*G08G 1/0967* (2006.01)
*H04L 29/08* (2006.01)

(58) Field of Classification Search
USPC ....... 455/456.2, 569.2, 456.1; 701/465, 409; 340/989, 539.1
See application file for complete search history.

(56) References Cited

U.S. PATENT DOCUMENTS

| | | | |
|---|---|---|---|
| 9,646,428 B1* | 5/2017 | Konrardy | H04W 4/90 |
| 10,008,893 B2* | 6/2018 | Nigo | H02K 21/16 |
| 10,042,359 B1* | 8/2018 | Konrardy | G05D 1/0088 |
| 2002/0042280 A1* | 4/2002 | Allen, Jr. | B60R 25/102 |
| | | | 455/456.2 |
| 2007/0015548 A1* | 1/2007 | Flick | G08G 1/20 |
| | | | 455/569.2 |
| 2012/0226440 A1* | 9/2012 | Nagda | G01C 21/26 |
| | | | 701/465 |
| 2014/0235268 A1* | 8/2014 | Proietti | G01S 5/0027 |
| | | | 455/456.1 |
| 2014/0278034 A1* | 9/2014 | Marko | G08G 1/0112 |
| | | | 701/119 |
| 2016/0063761 A1* | 3/2016 | Sisbot | B60W 50/14 |
| | | | 345/633 |
| 2016/0171521 A1* | 6/2016 | Ramirez | G06Q 30/0224 |
| | | | 701/409 |
| 2017/0131719 A1* | 5/2017 | Micks | B60W 40/08 |
| 2017/0243485 A1* | 8/2017 | Rubin | H04W 72/005 |
| 2018/0045832 A1* | 2/2018 | Ibrahim | G01S 17/936 |
| 2018/0109937 A1* | 4/2018 | Lee | H04W 4/046 |

* cited by examiner

(a) Control-Plane Protocol Stack (b) User-Plane Protocol Stack

METHOD AND APPARATUS FOR GATHERING LOCATION INFORMATION OF VEHICLE USER EQUIPMENT IN A WIRELESS ACCESS SYSTEM SUPPORTING V2X SERVICES

CROSS-REFERENCE TO RELATED APPLICATIONS

This application is the National Stage filing under 35 U.S.C. 371 of International Application No. PCT/KR2016/003681, filed on Apr. 8, 2016, which claims the benefit of U.S. Provisional Application No. 62/145,457, filed on Apr. 9, 2015, the contents of which are all hereby incorporated by reference herein in its entirety.

TECHNICAL FIELD

The present invention relates to a wireless access system, and more particularly, to methods and apparatus for gathering location information of a vehicular user equipment (VUE).

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.).

Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY OF THE INVENTION

The object of the present invention is to provide methods for efficiently gathering location information of the VUE.

Another object of the present invention is to define messages used for gathering the location information of the VUE.

Technical problems to be solved by the present invention are not limited to the above-mentioned technical problem, and other technical problems not mentioned above can be clearly understood by one skilled in the art from the following description.

The present invention provides methods and apparatus for gathering location information of a vehicular user equipment (VUE).

In one aspect of the present invention, a method for gathering location information in a wireless access system supporting vehicle to everything (V2X) service, the method performed by a vehicular user equipment (VUE) and comprising steps of receiving a Tracking Service Request message including a V2X tracking service indication field indicating tracking service is triggered or not and an identifier of the VUE; and transmitting a Tracking Service Response message including location information of the VUE in response to the Tracking Service Request message, wherein the location information includes a location field indicating a location coordinate of the VUE, a time field indicating current time and time zone information corresponding to the location information field, and a fuel level field indicating fuel level of the VUE.

The location information may further include a next Tracking Service Response field indicating series of location information and time information of the VUE estimated based on the location information.

The location information may further include a past location field indicating past locations and corresponding time stamps of the VUE.

The location information may further include a passenger information indicating a number of passengers of the VUE when the Tracking Service Request message is received.

The identifier may be an international mobile subscriber identity (IMSI) of the VUE, when the Tracking Service Request message is a unicast type paging message.

The identifier may be a vehicle identifier of the VUE uniquely identifying a vehicle where the VUE is adopted, when the Tracking Service Request message is a broadcast type paging message. In this case, the vehicle identifier is mapped to an IMSI of the VUE uniquely identifying the VUE and maintained in a network.

In addition, the method may further comprise step of transmitting a paging indication message including resource allocation information indicating resources where the Tracking Service Request message is to be transmitted.

In another aspect of the present invention, a vehicular user equipment (VUE) for gathering location information in a wireless access system supporting vehicle to everything (V2X) service, the VUE comprising a transmitter; a receiver; and a processor operatively connected with the transmitter and the receiver. Wherein the processor is configured to receive, by controlling the receiver, a Tracking Service Request message including a V2X tracking service indication field indicating tracking service is triggered or not and an identifier of the VUE; and transmit, by controlling the transmitter, a Tracking Service Response message including location information of the VUE in response to the Tracking Service Request message. In this case, the location information may include a location information field indicating a location coordinate of the VUE, a time field indicating current time and time zone information corresponding to the location information field, and a fuel level field indicating fuel level of the VUE.

The location information may further include a next Tracking Service Response field indicating series of location information and time information of the VUE estimated based on the location information.

The location information may further include a past location field indicating past locations and corresponding time stamps of the VUE.

The location information may further include a passenger information indicating a number of passengers of the VUE when the Tracking Service Request message is received.

The identifier may be an international mobile subscriber identity (IMSI) of the VUE, when the Tracking Service Request message is a unicast type paging message.

The identifier may be a vehicle identifier of the VUE uniquely identifying a vehicle where the VUE is adopted, when the Tracking Service Request message is a broadcast type paging message, and the vehicle identifier may be mapped to an IMSI of the VUE uniquely identifying the VUE and maintained in a network.

The processor of the VUE further configured to control the transmitter to transmit a paging indication message including resource allocation information indicating resources where the Tracking Service Request message is to be transmitted.

The above embodiments are part of preferred embodiments of the present invention. Obviously, it is to be understood to those having ordinary knowledge in the art that various embodiments having the technical features of the present invention can be implemented on the detailed description of the present invention as set forth herein.

According to exemplary embodiments of the present invention, the following advantages can be obtained.

First of all, it is possible that the authorized or commercial VUE is able to real time chase or tract the suspected or the targeted VUE.

Secondly, by defining the V2I messages such as the Tracking Service Request and Tracking Service Response messages, it is possible to using the cellular network (e.g., the 3GPP network) previously deployed without influencing the previous system.

Moreover, by acquiring the location information of the VUE, it is possible to estimates the next location of the VUE and prevent further harmful impacts to the public.

In addition, the V2I messages are transmitted through a transport layer (e.g., a paging channel), the location information of the VUE can be gathered regardless of the VUE's mode (e.g., IDLE mode) and an ACDC level of the network even when data channels are congested.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description served to explain the principle of the invention. In the drawings.

DETAILED DESCRIPTION OF THE INVENTION

Exemplary embodiments of the present invention provide a method and apparatus for gathering location information of a vehicular user equipment (VUE).

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between an enhance Node B (eNB) and a user equipment (UE). The eNB refers to a terminal node of a network, which directly or indirectly communicates with a UE. A specific operation described as being performed by the eNB may be performed by an upper node of the eNB.

Namely, it is apparent that, in a network comprised of a plurality of network nodes including the eNB, various operations performed for communication with a UE may be performed by the eNB, or network nodes other than the eNB. The term 'eNB' may be replaced with a fixed station, an ABS (Advanced Base Station), an MME (Mobility Management Entity), or a RSU (Road Side Unit) etc. Especially, it should be noted that the terms 'eNB' and 'eNode-B' are used interchangeably and the terms 'VUE', 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an UE may serve as a transmitter and an eNB (or NB) may serve as a receiver, on uplink.

Likewise, the UE may serve as a receiver and the eNB (or NB) may serve as a transmitter, on downlink.

The embodiments of the present invention are supported by standard documents disclosed for at least one of wireless access systems including a 3GPP system, a 3GPP LTE system, and a 3GPP2 system. In particular, the embodiments of the present invention are supported by 3GPP TS 22.885, 3GPP TS 22.185, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

Figure 1:
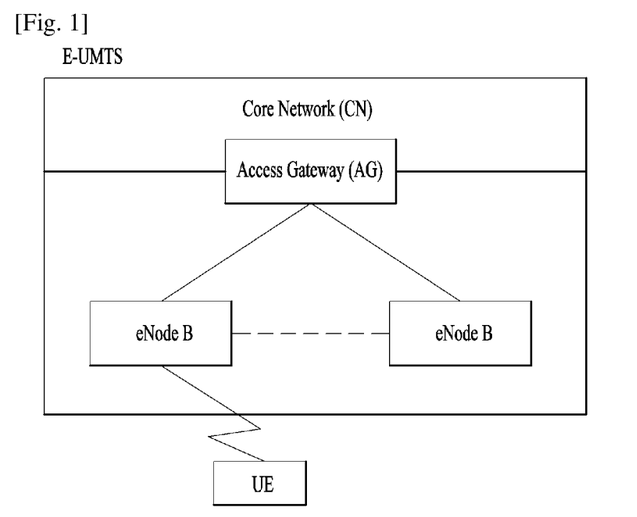
FIG. 1 illustrates a schematic structure a network structure of an evolved universal mobile telecommunication system (E-UMTS)

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
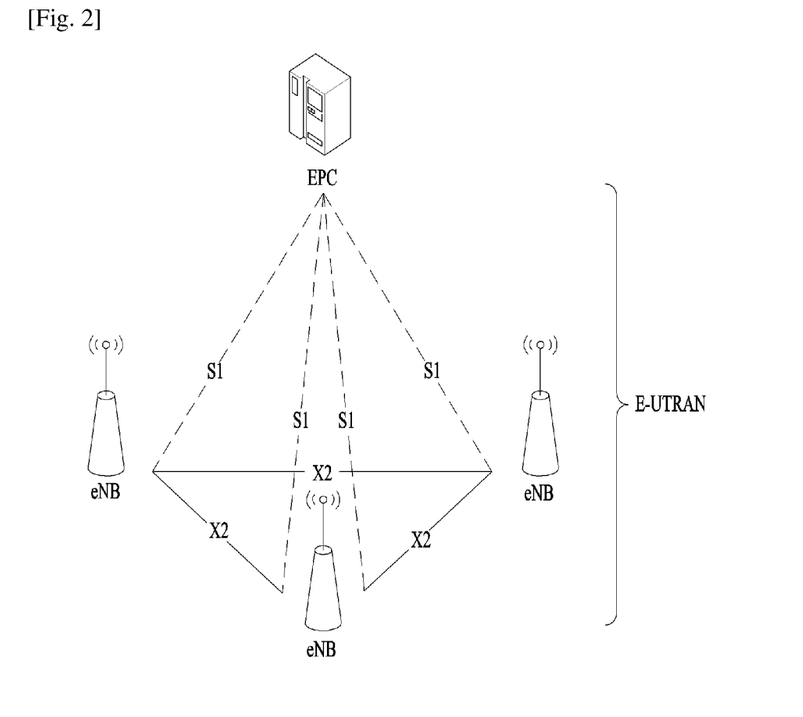
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
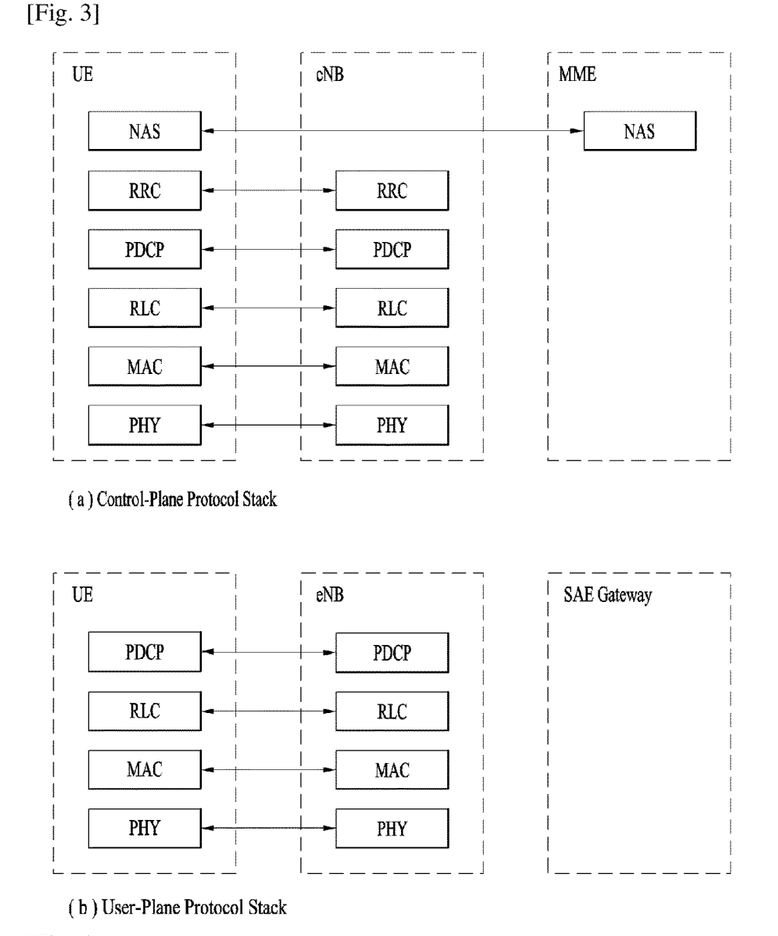
FIG. 3 illustrates the configurations of a radio interface protocol between the E-UTRAN and a UE.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management. NAS layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED are defined. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-IDLE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

One cell of the eNB is set to use a carrier bandwidth such as 1.25, 2.5, 5, 10 or 20 MHz to provide a downlink transmission or uplink reception service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Vehicle to Everything (V2X) Communication

The V2X communication described in the embodiments of the present application includes four types of V2X applications, such as (1) Vehicle to Vehicle (V2V), (2) Vehicle to Infrastructure (V2I), (3) Vehicle to Network (V2N), and (4) Vehicle to Pedestrian (V2P).

A V2X Service is a service where the V2X applications can be adopted and is a type of 3GPP communication service that involves a transmission or receiving device on a vehicle. Based on the other party involved in the communication, the V2X services can be divided into V2V Service, V2I Service, V2N service and V2P Service.

Figure 4:
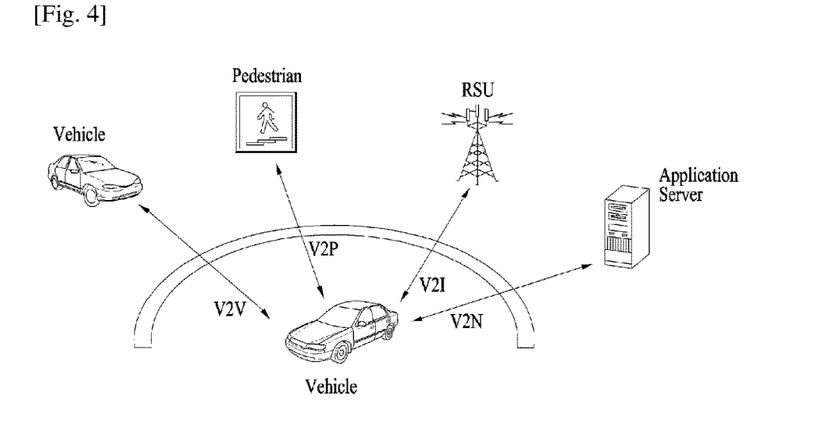
FIG. 4 illustrates types of V2X applications can be applied on embodiments of the present invention.

FIG. 4 illustrates types of V2X applications can be applied on embodiments of the present invention.

Referring to FIG. 4, the V2X communication involves several entities such as a Road Side Unit (RSU), an Application Server, a vehicle UE (VUE), and a pedestrian UE (PUE).

In this case, the RSU is a V2X Service enabled device that can transmit to, and receive from a moving vehicle using V2I Service, and includes UE type RSU, eNB-type RSU. The VUE is a V2X-enabled UE, which supports V2X Service. The VUE can be a UE adopted on the vehicle (e.g., car, motorcycle, bicycle, or train, etc.). The PUE is also a V2X-enabled UE supporting the V2X service but is held by the pedestrian.

The V2I Service is a type of V2X Service, where one party is a vehicle (e.g., VUE) whereas the other party is entity belonging to infrastructure. The V2P Service is a type of V2X Service, where one party is a VUE whereas the other party is a PUE carried by an individual (e.g., handheld terminal carried by a pedestrian, cyclist, driver or passenger). The V2V Service is a type of V2X Service, where both parties of the communication are vehicles. The V2V Communication Range is a direct communication range between two vehicles engaged in V2V Service.

The four types of V2X applications can use "co-operative awareness" to provide more intelligent services for end-users. This means that entities, such as vehicles, roadside infrastructure (e.g., RSU etc.), application server and pedestrians, can collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP. Three basic classes of applications for providing ITS services include road safety, traffic efficiency, and other applications. In this case, 3GPP network system only handles the transport of these messages to support different types of V2X applications.

The V2V applications expect UEs that are in proximity of each other to exchange V2V application information. 3GPP transport of messages containing V2V application information requires the UE to have a valid subscription and authorization from a network operator. Transport for a valid subscriber is provided whether the UE is served or not served by E-UTRAN.

E-UTRAN allows such UEs that are in proximity of each other to exchange V2V-related information using the E-UTRAN when permission, authorization and proximity criteria are fulfilled. The proximity criteria can be configured by the operator.

The UE supporting V2V applications is able to broadcast application layer information (e.g. about its position, dynamics, and attributes as part of the V2V service). The V2V payload may be flexible in order to accommodate different information contents, and the information can be broadcasted periodically according to a configuration provided by the operator. In addition, The UE supporting V2V applications is able to transmit messages containing V2V application information (e.g. location, dynamics, and attributes). The message payloads may be flexible in order to accommodate varying amount of information.

3GPP transport of message containing V2V application information may be predominantly broadcast-based. Such 3GPP transport includes the transport between UEs directly and/or, due to the limited direct communication range, the transport between UEs via infrastructure supporting V2X communication (e.g., RSU, application server, etc.).

The UE supporting V2I applications transmits messages containing V2I application information to an RSU. An RSU transmits messages containing V2I application information to one or more UEs supporting V2I applications.

The UE supporting V2N applications communicates with an application server supporting V2N applications. Both parties communicate with each other via the EPS.

V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information can be transmitted either by a UE supporting V2X application in a vehicle (e.g., warning to pedestrian), or by a UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, e.g., RSU, application server, etc.

Meanwhile, the main difference between 3GPP transport of messages with V2P and V2V application information is due to the properties of the UE. A UE supporting V2P applications used by pedestrian might, for example, have lower battery capacity, the radio sensitivity might be limited, e.g. due to antenna design, and therefore it may not be able to send messages with the same periodicity as UEs supporting V2V application, and/or receive messages.

3. Methods for Gathering Location Information of a VUE in Vehicular Communication Embodiments will be described hereinafter may be performed based on the technical characteristics described above sections 1 and 2.

One authorized vehicle (e.g., police vehicle etc.) or its driver/passenger(s) needs to keep track of the current location (or the history of the locations, trajectory) of another vehicle because of public services such as a chase of stolen vehicle. In addition, commercial services provided under allowing tracking each other also need the location information of the target VUE.

One of examples for use case of the present invention is that a police car (e.g., VUE A) has found a vehicle (e.g., VUE B) used/operated by a suspected criminal. And it is assumed that the VUE A and VUE B are V2X Service enabled. In addition, a RSU are deployed in the area of interest (e.g., in the metropolitan area of New York City, in which both vehicles will move around in this example). Under this situation, the VUE B is trying to escape, attempting to have its location not exposed to the VUE A (or the police). Meanwhile, the VUE A needs to keep track of the location of the VUE B.

Traditional location tracking services can be provided using the application layers (APPs), such as using Google map interface. However, it has some drawbacks. For example, data channels (data radio bearers) are usually used to convey tracking request and response for the methods that involve the application layers. In other words, the application layer cannot avoid using data channel to provide input or to receive the cloud-based computing results regarding the location. To use the data channel, a UE that is currently in an IDLE mode have to get into CONNECTED mode by performing Random Access procedure and have to go through associated barring process(es). In this case, if the serving network has ACDC (Application-specific Control for Data Communication) activated, the UE's in that affected areas, cannot easily get the location information through the use of data channel-based mechanism. It will suffer from limited coverage areas, reliability, and delay when the traffic load is high. In turn, it is not suitable for real-time tracking in some situations.

In this present invention, we propose transport layer-based methods to provide location tracking services using V2X communications that can work even when data channels are congested due to some reasons (e.g., overload of traffic, disastrous event, etc.), in which case the existing methods are heavily disturbed.

Figure 5:
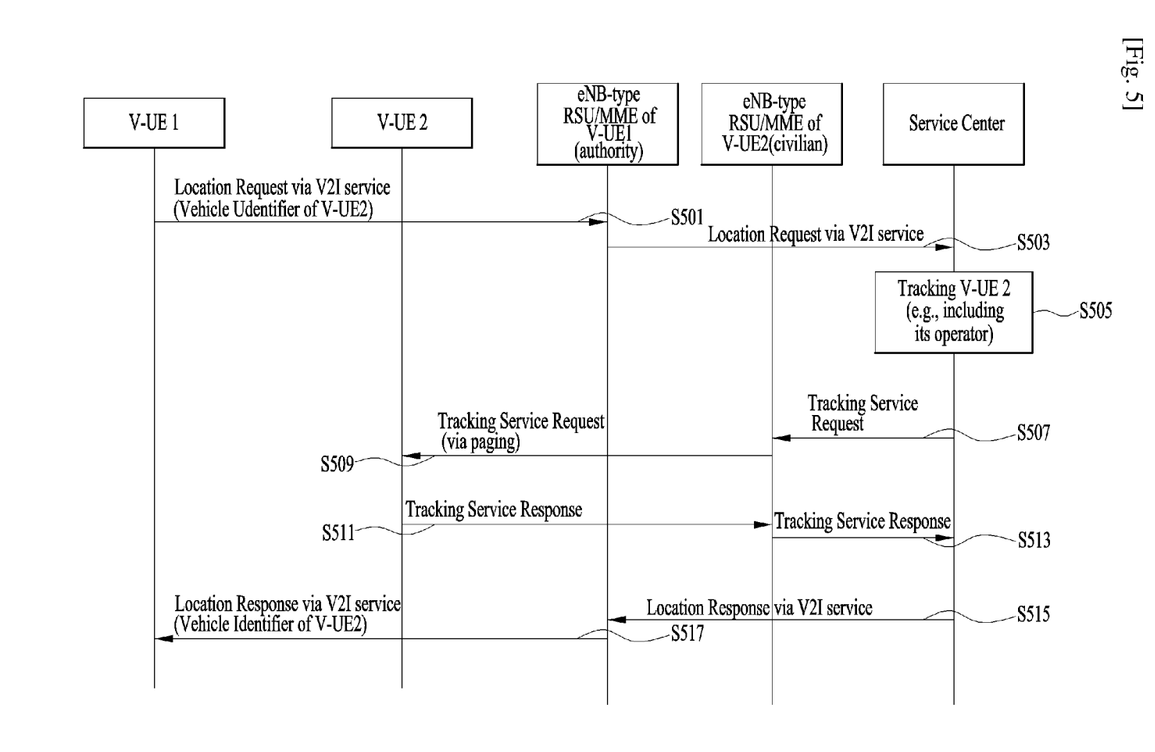
FIG. 5 illustrates one of embodiments of the present invention for gathering the location information of a VUE.

FIG. 5 illustrates one of embodiments of the present invention for gathering the location information of a VUE.

FIG. 5 shows one embodiment of the present invention with the entities involved and with the messages exchanged. It is noted that V2X service providers for VUE1 and VUE2 are different for illustration purpose. An authorized service provider or a common service provider may support both VUE1 and VUE2.

The wireless network supporting the vehicular communication involves entities a VUE1 on a vehicle A, a VUE2 on a vehicle B, a eNB-type RSU (or, MME of the VUE1), a eNB-type RSU (or, MME of the VUE2) and a Service Center (SC). At this time, it is supposed that the VUE1, VUE2, eNB-type RSUs, MMEs, and the SC are supported by the V2X services or applications.

Under this situation, if the VUE1 (e.g., in an authority body or civilian) wishes to know location information of the VUE2 (e.g., civilian) for public or commercial purposes, the VUE1 transmits a location request message requesting location related information of a VUE2 (e.g., vehicle B) to the SC via the V2I service. That is, the location request message is transmitted to the SC through the eNB-type RSU or MME managed by V2X service provider for V-UE1. The location request message includes a vehicle identifier of the VUE2 and/or a user identifier (e.g., IMSI) of the VUE2, and the vehicle identifier may be one of a registration number, a plate number, a vehicle identification number (VIN), and a car license of the VUE2 (S501, S503).

For a convenient explanation of the present invention, the method illustrated in FIG. 5 is performed for the public services. In this case, the SC can be a police station, a transportation bureau, or a department of transportation, etc. However, the method can be applied to the commercial services as the same manner. The SC may be operated by the service provider itself or third party.

The SC which has received the location request message tracks the VUE2 and an operator of the VUE2 based on the vehicle identifier and/or the user identifier included in the location request message. That is, the SC identifies the V2X service provider based on the vehicle identifier and/or the user identifier (S505).

After tracking the VUE2, the SC transmits a Tracking Service Request message to the operator of the VUE2 (S507) and the operator (e.g, MME) delivers the Tracking Service Request message to the VUE2 (S509).

At the steps S507 and S509, the service provider for the VUE2 pages the Tracking Service Request message through its eNB-type RSUs/MMEs. The Tracking Service Request message may be delivered using broadcast-type or unicast-type paging message.

When in using broadcast-type paging message (as in Paging message defined in 3GPP TS 36.331 standard document), a paging indication for V2X tracking is previously broadcast through the paging area(s). All vehicles that successfully received the paging indication look for the portion of the resource(s) (e.g., assigned resource block(s) (RB(s)) in PDSCH(s) for LTE/LTE-A) that contains the vehicle information being tracked for. Alternatively, information on the portion of the resource(s) may be pre-set (e.g., RB #10 in the 4th sub-frame after the sub-frame with paging indication) or may be included in the paging indication. The vehicle (e.g., the VUE2) that corresponds to the identity in the resource will respond using "Tracking Service Response" message with the information listed in Tracking Service Response message format described below (as in UEInformationResponse IE).

In order to use unicast-type paging procedure, V2X service providers may maintain vehicle-specific identifications. For example, when the V2X service of a VUE is enrolled, IMSI for specific VUE may be mapped with vehicle identification number (VIN) (or other forms of uniquely identifiable ID of the VUE). The V2X service provider of a VUE can use the paging procedure to track the VUE using the LTE transport layer. In the above embodiment, if VIN (or other forms of uniquely identifiable ID of vehicle) for VUE2 is provided by VUE1, the V2X service provider for VUE2 pages for VUE2 using IMSI corresponding to VIN (or other forms of uniquely identifiable ID of vehicle) for V-UE2.

Then, using Tracking Service Response message, V-UE2 delivers its location information with the information listed in Tracking Service Response message format described below (as in UEInformationResponse IE). Alternatively, if the V2X service provider does not maintain the vehicular specific identifications, both the vehicle identifier and the identifier of the VUE2 (e.g., v2x UE ID) have to be transmitted from the VUE1 through the location request message.

Referring back to FIG. 5, after receiving the Tracking Service Request message with its vehicle identifier, the VUE2 responds with "Tracking Service Response" message to the SC via the VUE2's service provider (e.g., the RSU/MME). In this case, depending on the power availability and the service coverage, the VUE2 may immediately begin to transmit a Tracking Service Response message and continue to transmit Tracking Service Response message(s) to the operator of the VUE2 (if it is served by the E-UTRAN) (S511, S513).

At the steps S511, S513, if the VUE2 is not served by the E-UTRAN now, the VUE2 can do the following actions. For example, the VUE2 may store the location information, if the power is still available. Or, the VUE2 may send the location information (if any) to the operator when it enters the area served by the E-UTRAN. In this case, the vehicle B's V2X Service-enabled UE (i.e., the VUE2) shall continue to send the Tracking Service Response message even if the vehicle B's engine is off. This is can be possible because even when the vehicle B's engine has been offed, the VUE2 on the vehicle B can be powered by a battery of the vehicle B. And then, the eNB-type RSU and/or the MME of the VUE2 deliver the Tracking Service Response message including the location information to the Service Center.

Lastly, the SC transmits the location response message including the location information of the VUE2 to the VUE1 through the service provider (e.g., the eNB-type RSU and/or the MME of the VUE1) for the VUE1 using V2I message. In this case, the location information includes current location of the VUE2 and/or estimated location of the VUE2 (S515, S517).

The message formats for the Tracking Service Request message and the Tracking Service Response message are more specifically described hereinafter.

Table 1 represents one of message formats for the Tracking Service Request message used at the steps S507 and S509 when the Tracking Service Request message is transmitted as the unicast type paging procedure, and Table 2 shows fields included in the Tracking Service Request message.

TABLE 1

```
-- ASN1START
Paging ::=                      SEQUENCE {
    pagingRecordList                PagingRecordList        OPTIONAL,   -- Need
ON
    systemInfoModification          ENUMERATED {true}       OPTIONAL,   -- Need
ON
    etws-Indication                 ENUMERATED {true}       OPTIONAL,   -- Need
ON
    nonCriticalExtension            Paging-v890-IEs         OPTIONAL
}
Paging-v890-IEs ::=             SEQUENCE {
    lateNonCriticalExtension        OCTET STRING            OPTIONAL,
    nonCriticalExtension            Paging-v920-IEs         OPTIONAL
}
Paging-v920-IEs ::=             SEQUENCE {
```

TABLE 1-continued

```
    cmas-Indication-r9              ENUMERATED {true}       OPTIONAL,   -- Need ON
    nonCriticalExtension            Paging-v1130-IEs        OPTIONAL
}
Paging-v1130-IEs ::=            SEQUENCE {
    eab-ParamModification-r11       ENUMERATED {true}       OPTIONAL,   -- Need ON
    nonCriticalExtension            SEQUENCE { }            OPTIONAL
}
Paging-v140-IEs ::=             SEQUENCE {
    v2xTrackingService-Indication               ENUMERATED {true}       OPTIONAL, -- Need ON
    nonCriticalExtension            SEQUENCE { }            OPTIONAL
}
PagingRecordList ::=            SEQUENCE (SIZE (1. . . maxPageRec)) OF PagingRecord
PagingRecord ::=                SEQUENCE {
    ue-Identity                     PagingUE-Identity,
    cn-Domain                       ENUMERATED {ps, cs},
    . . .
}
PagingUE-Identity ::=           CHOICE {
    s-TMSI                          S-TMSI,
    imsi                            IMSI,
    v2xueid                         V2XUEID, //optional
    . . .
}
IMSI ::=                        SEQUENCE (SIZE (6. . . 21)) OF IMSI-Digit
IMSI-Digit ::=                  INTEGER (0. . . 9)
-- ASN1STOP
```

TABLE 2

Paging field descriptions cmas-Indication

If present: indication of a CMAS notification.
cn-Domain

Indicates the origin of paging.
eab-ParamModification

If present: indication of an EAB parameters (SIB14) modification.
v2xTrackingService-Indication If present: indication of a Tracking Service Request for V2X
etws-Indication If present: indication of an ETWS primary notification and/or ETWS secondary notification.
imsi The International Mobile Subscriber Identity, a globally unique permanent subscriber identity, see TS 23.003 [27]. The first element contains the first IMSI digit, the second element contains the second IMSI digit and so on.
v2xueid The International Mobile Subscriber Identity for V2X UE, a globally unique permanent subscriber identity (V2X ID).
systemInfoModification If present: indication of a BCCH modification other than SIB10, SIB11, SIB12 and SIB14.
ue-Identity Provides the NAS identity of the UE that is being paged.

Referring to Tables 1 and 2, the Tracking Service Request message includes the v2xTrackingService-Indication field and the v2xueid field. The v2xTrackingService-Indication field (or, a Tracking Service Request flag field) is an indication whether a Tracking Service Request for the V2X service is triggered or not. The v2xueid field represents an International Mobile Subscriber Identity (IMSI) for V2X UE (i.e., the VUE2) or a globally unique permanent subscriber identity (V2X ID for the VUE2). In this case, the v2xueid is mapped with the vehicle identifier (e.g., the VIN) of the VUE2. That is, if the service operator and/or the SC maintains the identification of the VUE2 when the VUE2 enrolls the V2X service, the service operator and/or the SC is able to know the v2xueid field mapped with the vehicle identifier of the VUE2. Alternatively, if the location request message includes both the vehicle identifier and the IMSI of the VUE2, the service operator and/or the SC is able to know which VUE should be paged. Therefore, the SC may transmit the paging message including the Tracking Service Request message in a unicast manner.

The other field listed in Table 1 and 2 may be referred to 3GPP TS 36.331 specification documents.

Table 3 represents another message format for the Tracking Service Request message used at the steps S507 and S509 when the Tracking Service Request message is transmitted as the broadcast type paging procedure.

TABLE 3

```
-- ASN1START
Paging ::=          SEQUENCE {
                    pagingRecordList        PagingRecordList    OPTIONAL,   -- Need ON
                    systemInfoModification  ENUMERATED {true}   OPTIONAL,   -- Need
```

TABLE 3-continued

```
ON
                    etws-Indication          ENUMERATED {true}      OPTIONAL,    -- Need
ON
                    nonCriticalExtension     Paging-v890-IEs        OPTIONAL
}
Paging-v890-IEs ::= SEQUENCE {
                    lateNonCriticalExtension OCTET STRING           OPTIONAL,
                    nonCriticalExtension     Paging-v920-IEs        OPTIONAL
}
Paging-v920-IEs ::= SEQUENCE {
                    cmas-Indication-r9       ENUMERATED {true}      OPTIONAL,    -- Need
ON
                    nonCriticalExtension                   Paging-v1130-OPTIONAL
                                                           IEs
}
Paging-v1130-IEs ::=                         SEQUENCE {
                    eab-ParamModification-r11 ENUMERATED {true}     OPTIONAL,    -- Need
ON
                    nonCriticalExtension     SEQUENCE { }           OPTIONAL
}
Paging-v140-IEs ::= SEQUENCE {
                    v2xTrackingService-Indication  ENUMERATED {true}
                    OPTIONAL, -- Need ON
                    vehical identifier
                    nonCriticalExtension     SEQUENCE { }           OPTIONAL
}
PagingRecordList ::=                         SEQUENCE (SIZE (1. . . maxPageRec)) OF PagingRecord
PagingRecord ::=                             SEQUENCE {
                    ue-Identity                    PagingUE-Identity,
                    cn-Domain                      ENUMERATED {ps, cs},
                    . . .
}
PagingUE-Identity ::=                        CHOICE {
                    s-TMSI                         S-TMSI,
                    imsi                           IMSI,
                    . . .
}
IMSI ::=                                     SEQUENCE (SIZE (6. . . 21)) OF IMSI-Digit
IMSI-Digit ::=                               INTEGER (0. . . 9)
-- ASN1STOP
```

If the Tracking Service Request message is broadcast, a paging indication message includes resource allocation information for transmitting the Tracking Service Request message may be previously transmitted. That is, the Tracking Service Request message may be transmitted on the resources allocated by the paging indication message.

Alternatively, the Tracking Service Request message may be broadcast through predetermined resources (e.g., RB #10 in a fourth subframe after the subframe with the paging indication).

All of the vehicle UEs which received the Tracking Service Request message decode the Paging-v140-IEs and then a VUE corresponding to the vehicle identifier (i.e., the VUE2) transmits the Tracking Service Response message including the requested location information.

Table 4 represents one of formats for the Tracking Service Response message used at the steps S511 and S513. The Tracking Service Response message includes location information such as Table 4.

TABLE 4

-- ASN1START
...
V2X ID; // Vehicle's profile information (other types)
Location coordinates; <[l]bits (X- coordinate), [m]bits, Y-coordinate), [n]bits, Z-coordinate)>;
    (or alternatively, <[l]bits (X- coordinate), [m]bits, Y-coordinate)>);
Time of the coordinates;

TABLE 4-continued

A series of the past [k] location coordinates and the corresponding time-stamps;
V2X accessory information; // the fuel level (the charging level), number of passengers (whichever available);
...

Referring to Table 4, the location information includes the V2X ID field, the Location coordinates field, the Time of the coordinates field, the series of the past [k] location coordinates and the corresponding time-stamps field, and the V2X accessory information field.

The V2X ID field is the same as the vehicle identifier of the VUE2. The Location coordinates field indicates the location of the VUE2 with 3 axis values (X, Y and Z coordinates) or 2 axis values (X and Y coordinates). In this case, the Location coordinates field has time-stamp describing the time when the coordinate was obtained by the VUE2. A past location field (i.e., A series of the past [k] location coordinates and the corresponding time-stamps field) indicates past locations of the VUE2 and corresponding time stamps. The V2X accessory information field includes the fuel level (or charging level) and the number of passengers in the VUE2 corresponding to the time stamp.

The Tracking Service Response message may be transmitted via a UEInformationResponse message described in 3GPP TS 36.331 specification documents.

That is, the UEInformationResponse IE is used by the VUE2 to transfer the location information requested by the E-UTRAN.

Table 5 represents one of formats for a UEInformation-Response Information Element (IE) carrying the Tracking Service Response message. The UEInformationResponse IE including the Tracking Service Response message is transmitted from the VUE2 to the E-UTRAN (i.e., the e-NB type RSU and/or the MME) via a Dedicated Control Channel (DCCH). The UEInformationResponse message may be used at the steps S511 and S513.

TABLE 5

```
-- ASN1START
...
UEInformationResponse-v14xy-IEs ::= SEQUENCE {
        trackingServiceResponse-r14         TrackingServiceResponse-r14
        nonCriticalExtension                SEQUENCE { }               OPTIONAL
}
...
TrackingServiceResponse-r14 ::=                      SEQUENCE {
        timeStamp-r14                 TimeStamp, // time, time zone info;
        locationInfo-r14              LocationInfo-r14
        fuelLevelInfo-r14             FuelLevelInfo -r14         OPTIONAL
        passengerLoadInfo-r14         PassengerLoadInfo -r14     OPTIONAL
        nextTrackingServiceResponse-r14              SEQUENCE {
                timeStamp-r14         TimeStamp, // time, time zone info;
                locationInfo-r14      LocationInfo-r14
        }
        ... // nextTrackingServiceReponse (series of (location,time)
info)
}
-- ASN1STOP
```

The Tracking Service Response message included in the UEInformationResponse IE is used to indicate the time and coordinates in [xx] most recently stored location information of the VUE2, where [xx] can be a whole number (e.g., 1, 2, . . . , 8, . . . , 16, . . . , 32, . . . etc.).

Referring to Table 5, the Tracking Service Response message includes location information of the VUE2. The location information includes the timestamp field, the locationinfo field, the fuelLevelInfo field, the passengerLoadInfo field, and the nextTrackingServiceResponse field which includes the timestamp.

The locationInfo field indicates the location coordinate with 3 or 2 axis values of the VUE2. The timeStamp field indicates the current time and time zone information corresponding to the locationInfo field. The fuelLevelInfo indicates fuel level or charging level of the VUE2 when the Tracking Service Request message is received. The passengerLoadInfo indicates the number of passengers of the VUE2 when the Tracking Service Request message is received.

The nextTrackingServiceResponse field includes a timestamp field and locationInfo field. The nextTrackingServiceResponse field indicates series of location information and time information estimated by the VUE2 based on the location information and the fuel information of the VUE2. Alternatively, the nextTrackingServiceResponse field may not be included in the Tracking Service Response message. In this case, the CS of the VUE2 may estimate or calculate the value of the nextTrackingServiceResponse field based on the timestamp field, the locationInfo field, and the fuelLevelInfo field which were recently available, and then the CS transmits the nextTrackingServiceResponse field, with the estimated information, along with the location response message to the VUE1 at the step of S515 or S517.

In the above Tracking Service Response message formats of Table 4 and 5, the fuel level information (or, the fuelLevelInfo field) and the number of passenger information (or, the passengerLoadInfo field) are included. Information on the fuel level and the number of passengers may be used by law enforcement authority (e.g., police etc.) for further protection. For example, the fuel level in conjunction with trajectory location information, speed, fuel efficiency of the car, and the estimation of future direction may be used by the authority to deploy the necessary law enforcement to possible future locations to prevent further harmful impacts to the public.

At the Table 4, the series of the past [k] location coordinates and the corresponding time-stamps field can show what routes were taken by the vehicle at given times. By using this field, the VUE1 is able to easily chase the VUE2.

4. Apparatuses for Implementing the Aforementioned Methods

Figure 6:
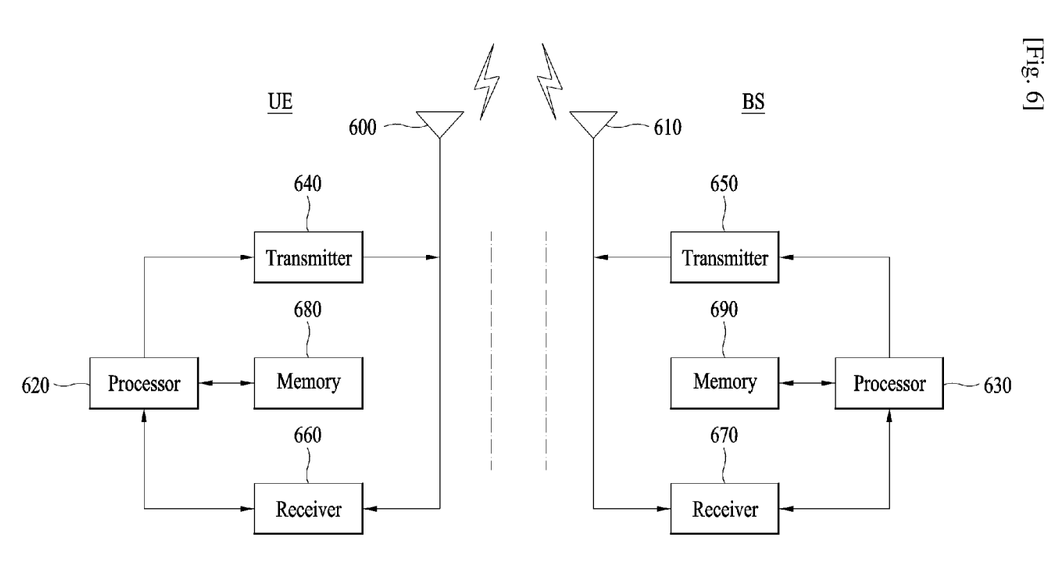
FIG. 6 shows apparatuses for implementing the above-mentioned methods described with reference to FIGS. 1 through 5.

FIG. 6 shows apparatuses for implementing the above-mentioned methods described with reference to FIGS. 1 to 5.

A UE can serve as a transmitting end on uplink and as a receiving end on downlink. An eNB can serve as a receiving end on uplink and as a transmitting end on downlink.

The UE and the eNB may include a transmitter 640 and 650 and receiver 660 and 670 for controlling transmission and reception of signal, data and/or messages and antennas 600 and 610 for transmitting and receiving signal, data and/or messages, respectively.

In addition, the UE and the eNB may respectively include processors 620 and 630 for performing the above-described embodiments of the present invention and memories 670 and 690 for storing processing procedures of the processors temporarily or continuously.

The embodiments of the present invention can be performed using the aforementioned components and functions of the UE and the eNB. The apparatuses shown in FIG. 6 may be one of members illustrated in FIGS. 1, 2 and 4. For example, the eNB in FIG. 6 can be referred to the RSU or CS and the UE in FIG. 6 can be referred to one of the VUEs.

The processor of the VUE1 may control the transmitter to transmit the location request message to the network including the RSU and the CS. The processor of the CS or the RSU controls the transmitted to transmit the Tracking Service Request message via the paging channel. The processor of the VUE2 may control the transmitter to transmit the Tracking Service Response message including the location information of the VUE2. Finally, the CS or the RSU controls the transmitter to transmit the location response message including the location information of the VUE2 to the VUE1. The specific embodiments by performing the VUEs and the eNB can be referred to the embodiments explained above.

The transmitter 640 and 650 and the receiver 660 and 670 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP and/or 3GPP2 system, etc. The embodiments of the present invention may be applied to technical fields using the various wireless access systems in addition to the wireless access systems.

What is claimed is:

1. A method for gathering location information in a wireless access system supporting a vehicle to everything (V2X) service, the method performed by a vehicular user equipment (VUE) and comprising:
    receiving a Tracking Service Request message including an identifier of the VUE and a V2X tracking service indication field indicating whether tracking service is triggered, wherein the Tracking Service Request message is a paging message received based on preset resources for the V2X service; and
    transmitting a Tracking Service Response message including location information of the VUE in response to the received Tracking Service Request message,
    wherein the location information includes a location information field indicating a location coordinate of the VUE, a time field indicating current time and time zone information corresponding to the location information field, a fuel level field indicating a fuel level of the VUE, and a previous location field indicating previous locations and corresponding time stamps.

2. The method of claim 1, wherein the location information further includes a next Tracking Service Response field indicating a series of location information and time information of the VUE estimated based on the location information.

3. The method of claim 1, wherein the location information further includes passenger information indicating a number of passengers in the VUE when the Tracking Service Request message is received.

4. The method of claim 1, wherein the identifier is an international mobile subscriber identity of the VUE when the Tracking Service Request message is a unicast type paging message.

5. The method of claim 1, wherein the identifier is a vehicle identifier of the VUE uniquely identifying a vehicle in which the VUE is located when the Tracking Service Request message is a broadcast type paging message.

6. The method of claim 5, wherein the vehicle identifier is mapped to an international mobile subscriber identity of the VUE uniquely identifying the VUE and maintained in a network.

7. The method of claim 5, the method further comprising transmitting a paging indication message including resource allocation information indicating resources for transmitting the Tracking Service Request message.

8. A vehicular user equipment (VUE) for gathering location information in a wireless access system supporting a vehicle to everything (V2X) service, the VUE comprising:
    a transmitter configured to transmit information;
    a receiver configured to receive information; and
    a processor operatively connected with the transmitter and the receiver, wherein the processor is configured to:
    control the receiver to receive a Tracking Service Request message including an identifier of the VUE and a V2X tracking service indication field indicating whether tracking service is triggered, wherein the Tracking Service Request message is a paging message received based on preset resources for the V2X service; and
    control the receiver to transmit a Tracking Service Response message including location information of the VUE in response to the received Tracking Service Request message,
    wherein the location information includes a location information field indicating a location coordinate of the VUE, a time field indicating current time and time zone information corresponding to the location information field, a fuel level field indicating a fuel level of the VUE, and a previous location field indicating previous locations and corresponding time stamps.

9. The VUE of claim 8, wherein the location information further includes a next Tracking Service Response field indicating series of location information and time information of the VUE estimated based on the location information.

10. The VUE of claim 8, wherein the location information further includes passenger information indicating a number of passengers in the VUE when the Tracking Service Request message is received.

11. The VUE of claim 8, wherein the identifier is a vehicle identifier of the VUE uniquely identifying a vehicle in which the VUE is located when the Tracking Service Request message is a broadcast type paging message.

12. The VUE of claim 11, wherein the identifier
is mapped an international mobile subscriber identity of the VUE when the Tracking Service Request message is a unicast type paging message.

13. The VUE of claim 12, wherein the processor further configured to control the transmitter to transmit a paging indication message including resource allocation information indicating resources for transmitting the Tracking Service Request message.

14. The VUE of claim 11, wherein the vehicle identifier is mapped to an international mobile subscriber identity of the VUE uniquely identifying the VUE and maintained in a network.

* * * * *